United States Patent
Lenz, Jr.

(10) Patent No.: US 11,035,558 B2
(45) Date of Patent: Jun. 15, 2021

(54) POLE ASSEMBLY AND METHOD OF USE

(71) Applicant: HME, Incorporated, Wyoming, MI (US)

(72) Inventor: Kenneth C. Lenz, Jr., Hudsonville, MI (US)

(73) Assignee: HME, Incorporated, Wyoming, MI (US)

( * ) Notice: Subject to any disclaimer, the term of this patent is extended or adjusted under 35 U.S.C. 154(b) by 243 days.

(21) Appl. No.: 16/453,088

(22) Filed: Jun. 26, 2019

(65) Prior Publication Data

US 2020/0408392 A1 Dec. 31, 2020

(51) Int. Cl.
  *F21V 21/22* (2006.01)
  *F16M 11/28* (2006.01)
  *F16B 7/14* (2006.01)

(52) U.S. Cl.
  CPC ............ *F21V 21/22* (2013.01); *F16B 7/1472* (2013.01); *F16M 11/28* (2013.01)

(58) Field of Classification Search
  CPC ........ B62J 1/00; B62J 1/06; B62J 1/08; F16B 7/1427; F16B 7/1463; F16B 7/1472; Y10T 403/32467; Y10T 403/32501; Y10T 403/32508
  See application file for complete search history.

(56) References Cited

U.S. PATENT DOCUMENTS

| | | | |
|---|---|---|---|
| 4,576,501 A | 3/1986 | McConnell | |
| 4,744,690 A * | 5/1988 | Hsieh | F16B 7/1418 248/411 |
| 4,818,135 A | 4/1989 | Desjardins | |
| 5,259,612 A | 11/1993 | Matheme et al. | |
| 5,634,619 A | 6/1997 | Alessi | |
| 5,927,810 A * | 7/1999 | Liao | A47C 9/08 297/344.12 |
| 6,155,743 A * | 12/2000 | Chen | F16B 7/1418 248/161 |
| 6,312,184 B1 * | 11/2001 | Hoshino | F16B 7/1418 403/104 |
| 6,557,878 B2 * | 5/2003 | Chen | B62J 1/08 280/226.1 |
| 7,980,781 B2 | 7/2011 | Trice | |

(Continued)

FOREIGN PATENT DOCUMENTS

EP 1992827 B1 8/2011

*Primary Examiner* — Daniel J Wiley
(74) *Attorney, Agent, or Firm* — Warner Norcross + Judd LLP (57) ABSTRACT

A pole assembly to support a device at an elevation and including a slidably joined first tube and second tube. A first collar mounts to an end of the first tube and the second tube protrudes from the end. A second collar is adjacent the first collar. A lock-and-key coupling, associated with the collars, prevents them from separating longitudinally along the tubes. The coupling is operable in adjustment and lock modes while a key is in a lock aperture to secure the collars together. In the adjustment mode, the tubes can slidably move relative to one another. In the lock mode, the first tube can be fixed relative to the second tube. The key can slide radially inward and outward, toward and away from a longitudinal axis of the first and second tubes when the lock-and-key coupling transitions from the adjustment mode to the lock mode and vice versa.

20 Claims, 7 Drawing Sheets

(56) References Cited

U.S. PATENT DOCUMENTS

| | | |
|---|---|---|
| 8,832,910 B2 | 9/2014 | Lah |
| 9,464,650 B2 | 10/2016 | Lin |
| 9,631,656 B2 * | 4/2017 | Sato .................. F16B 7/1418 |
| 10,051,930 B2 | 8/2018 | Heim |
| 2008/0145140 A1 * | 6/2008 | Chen .................. B62K 19/36 |
| | | 403/24 |

* cited by examiner

POLE ASSEMBLY AND METHOD OF USE

BACKGROUND OF THE INVENTION

This disclosure generally relates to pole assemblies configured to support a device at an elevation, and more particularly to a pole assembly and a related method of use, where the pole assembly includes first and second collars joined by a lock-and-key coupling.

There are a variety of industries and professions that utilize lighting to illuminate work areas. Many times, the lighting needs to be elevated to illuminate as much of a work area as possible, to eliminate clutter in the area and to maximize the total lighted area at a given light output. To elevate it, lighting typically is attached to a frame, or in some cases, to an elongated pole assembly that is configured to support the lighting or other device at a particular level from the ground. In the emergency rescue and firefighting context, high output LED spot and/or flood lights are mounted on portions of a pole assembly, and the pole assembly is erected to support the lighting in a particular orientation to adequately illuminate a fire or emergency scene.

Frequently, a pole assembly is designed so a user can rapidly dispose an associated light at a variety of selected elevations. To achieve this functionality, some pole assemblies include inner and outer tubes slidably joined with one another. One or more lights can be secured fixedly to the first tube. The second tube can be oriented vertically so that an object, such as a light, can be adjustably secured at a desired elevation by sliding the first tube along the second tube. Various pole assemblies have been developed to allow for the first tube to be secured at a set position along the second tube. However, these pole assemblies include components that are difficult and expensive to manufacture and can be cumbersome to use.

SUMMARY OF THE INVENTION

A pole assembly configured to support a device at an elevation is provided. The pole assembly can include a first collar, a second collar, a first tube, a second tube, and a lock-and-key coupling joining the first and second collars to selectively fix the orientation of the first tube relative to the second tube, and thus an elevation or location of a device associated with at least one of the first and second tubes.

In one embodiment, the second tube can be slidably disposed in the first tube. The first collar can be fixedly and immovably mounted to a first end of the first tube and the second tube can protrude from the first end of the first tube. The second collar can be adjacent the first collar and the second collar at least partially circumferentiates the second tube.

In another embodiment, the lock-and-key coupling can include a key and a lock aperture associated with respective ones of the first and second collars. The coupling can be operable in an adjustment mode in which the first tube can slidably move relative to the second tube while the key is disposed in the lock aperture. The coupling can be operable in a lock mode in which the first tube is in a fixed orientation relative to the second tube while the key is disposed in the lock aperture.

In still another embodiment, the key can be received within the lock aperture and can slide radially inward toward a longitudinal axis of the first and second tubes when the lock-and-key coupling transitions from the adjustment mode to the lock mode. The key also can slide radially outward away from the longitudinal axis of the first and second tubes when the coupling transitions from the lock mode to the adjustment mode.

In yet another embodiment, the lock-and-key coupling can include a key extending from at least one of the first collar and the second collar and a lock aperture defined by and extending through a wall of the other of the at least one of the first collar and the second collar. The key can be received in the lock aperture, and can move at least one of radially inward toward and radially outward away from a longitudinal axis of the first and second tubes.

In yet another embodiment, the lock-and-key coupling is operable in an adjustment mode in which the second collar is loosened relative to the second tube so that the first tube can slideably move relative to the second tube while the key is disposed in the lock aperture with the key at a first distance from the longitudinal axis.

In a further embodiment, the lock-and-key coupling is operable in a lock mode, in which the second collar clampingly engages the second tube so that the first tube is in a fixed orientation relative to the second tube while the key is disposed in the lock aperture with the key at a second distance, less than the first distance, from the longitudinal axis.

In still a further embodiment, a method of operating a pole assembly is provided. The method can include: providing a pole assembly having a first tube and a second tube inside the first tube, with a first collar and second collar adjacent one another and at least partially circumferentiating the first tube and the second tube, respectively; sliding the first tube over the second tube in an adjustment mode to move the first tube along the second tube from a first position on the second tube; tightening a fastener to clampingly engage the second tube in a lock mode so as to fix an orientation of the first tube relative to the second tube and thereby fix the first tube at a second position on the second tube; moving a key in a lock aperture during the tightening so that the key moves radially inward toward a longitudinal axis of the first and second tubes, without the key clamping the first and second tubes. The key can remain in the aperture in the lock mode and the adjustment mode.

The methods and articles of this disclosure provide for improved pole assemblies that are simple to manufacture and use. These and other objects, advantages, and features of the invention will be more fully understood and appreciated by reference to the detailed description and drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

A pole assembly and a method of use thereof are provided. As described herein, the pole assembly is adapted for adjustably securing a first tube along a second tube to adjustably support a device mounted to the first tube at an elevation. The pole assembly comprises components that are simple and inexpensive to manufacture and the pole assembly is simple to assemble and use. As will be appreciated in view of the description herein, the design and material construction of the pole assembly provides for increased usability and convenience, reduced manufacturing costs, and/or decreased need for paint or other surface treatments (e.g., those necessary to prevent corrosion).

As shown in the figures, a pole assembly is illustrated and generally designated 20. Certain features of the pole assembly 20 are functional, but can be implemented in different aesthetic configurations. The pole assembly can include a first tube 22, a second tube 24, a first collar 26, a second collar 28, a lock-and-key coupling 30 and a bushing 32.

As illustrated, the second tube 24 can be slidably disposed in the first tube 22. The first tube 22 can include an inner diameter and the second tube 24 can include an outer diameter. The inner diameter is greater than the outer diameter so that the second tube 24 can be inserted within the first tube 22. The first tube 22 includes a first length and the second tube 24 includes a second length. Optionally, the first length can be less than the second length. The first tube 22 can be configured so that the second tube 24 enters the first tube 22 at a first end 34 of the first tube 22 and exits the first tube 22 at a second end 36 of the first tube 22 so that the second tube 24 spans an entirety of the first length within the first tube 22. Optionally, the second tube 24 can be a rod, rather than a tube, and may include no internal voids. The second tube 24 is configured to protrude from the first end 34 of the first tube 22 when extended.

The second tube 24 and the first tube 22 can be coaxially aligned so as to define a common longitudinal axis 38 (alternatively referred to as "longitudinal axis") of the first tube 22 and the second tube 24. The second tube 24 can be slidably disposed within the first tube 22 so that the first tube 22 can be slid along, relative to and/or parallel to the common longitudinal axis 38 while the second tube 24 is disposed within the first tube 22. The second tube 24 can be slidably disposed within the first tube 22 so that the first tube 22 can be slid over the second tube 24 from a first position on the second tube 24 to a second position on the second tube 24. The first tube 22 and the second tube 24 are circular in cross section, where the cross section is taken perpendicular to the common longitudinal axis 38.

As shown in FIGS. 1-2, and 5-7, the first collar 26 can be fixedly and immovably mounted to the first end 34 of the first tube 22. The first collar 26 can at least partially surround or extend around a portion of the first tube 22. The first collar 26 can include a first engagement rim 40 and a first collar outer surface 42. The first collar 26 can include a first securement aperture 44 defined by and passing through a wall 46 of the first collar 26. An axis of the first securement aperture 44 can be perpendicular to the longitudinal axis 38 of the first tube 22 and second tube 24. The first securement aperture 46 can define a threaded surface for threadably engaging a first fastener 48. The first collar 26 can include a second securement aperture (not shown) radially opposed to the first securement aperture 46 and defined by and passing through the wall 46 of the first collar 26. In some cases, the first collar 26 can include multiple securement apertures.

In some embodiments, the first collar 26 can be fixedly and immovably mounted to the first end 34 of the first tube 22 by threading a first fastener 48 (e.g., a threaded fastener such as a screw or bolt) through the first securement aperture 46 and tightening the first fastener 48 until the first fastener 48 engages with an outer surface 50 of the first tube 22 to create an interference fit between the first tube 22 and the first fastener 48 to secure the collar in place. In some embodiments, the first tube 22 defines an aperture (not shown), which may optionally be threaded, for receiving the first fastener 48 and configured to facilitate immovable mounting of the first collar 26 to the first end 34. Optionally or alternatively, the first collar 26 is secured immovably to the first end 34 by an adhesive, welding, press fitting or other attachment devices. In some cases, the first fastener 48 is tightened until the first fastener 48 it clamps against and creates an indent in the first tube 22.

As shown in FIGS. 1-9, the second collar 28 can be placed adjacent the first collar 26 and at least partially circumvents the second tube 24. The second collar 28 can include a first arm 52 and a second arm 54. The first arm 52 and the second arm 54 together can define a gap 56. The gap 56 can define a gap space 58 that is continuous with an interior space 60 defined by an interior surface 62 of the second collar 28. The gap 56 can extend continuously along a third length 64 of the second collar 28. Optionally, the second collar 28 is monolithic in construction. Further optionally, the second collar includes two interlinking elements where one of the interlinking elements includes the first arm 52 and the other interlinking element includes the second arm. Together, the two interlocking elements can constitute the second collar 28. In some embodiments the interlinking elements can share at least partial mirror symmetry with one another across a plane parallel to an axis of the second collar 28. The first arm 52 can be opposed to the second arm 54 so that a first surface 66 of the first arm 52 overlaps and is opposed to a second surface 68 of the second arm 54.

As shown in FIGS. 2-7, the second collar 28 can include a second engagement rim 70. The first engagement rim 40 can be disposed adjacent to the second engagement rim 70. The first arm 52 and the second arm 54 together and/or separately can define a fastener aperture 72 for receiving a second fastener 74. The second fastener 74 can extend through the first arm 52 and the second arm 54 of the second collar 28. The second fastener 74 can be tightened to draw the first arm 52 and the second arm 54 toward one another and thereby clampingly engage the second tube 24. Tightening the second fastener 74 causes the first surface 66 to be drawn toward the second surface 68 to thereby cause a gap width 76 to decrease. Tightening the second fastener 74 also causes the interior surface 62 of the second collar 28 to physically engage with an outer surface 78 of the second tube 24 to establish an interference fit therewith. In various embodiments, tightening the second fastener 74 causes a diameter of the second collar 28 to decrease and loosening the second fastener 74 causes a diameter of the second collar 28 to increase. Optionally, the second collar 28 exerts a spring-force upon the second fastener 74.

In some cases, the fastener aperture 72 can define threading within one or both of the first arm 52 and/or the second arm 54 for threadably engaging with the second fastener 74. Optionally, the second fastener 74 includes a nut 82 threadably engaged with a bolt 80. One of the first arm 52 and the second arm 54 can define a recess 79 configured for receiving the nut 82 and preventing rotation of the nut 82 during tightening of the second fastener 74. The second fastener 74 includes a knob 83 secured to the bolt 80. The knob 83 is configured to allow the bolt 80 to be tightened by hand using the knob 83, rotating it in a desired direction.

Figure 6:
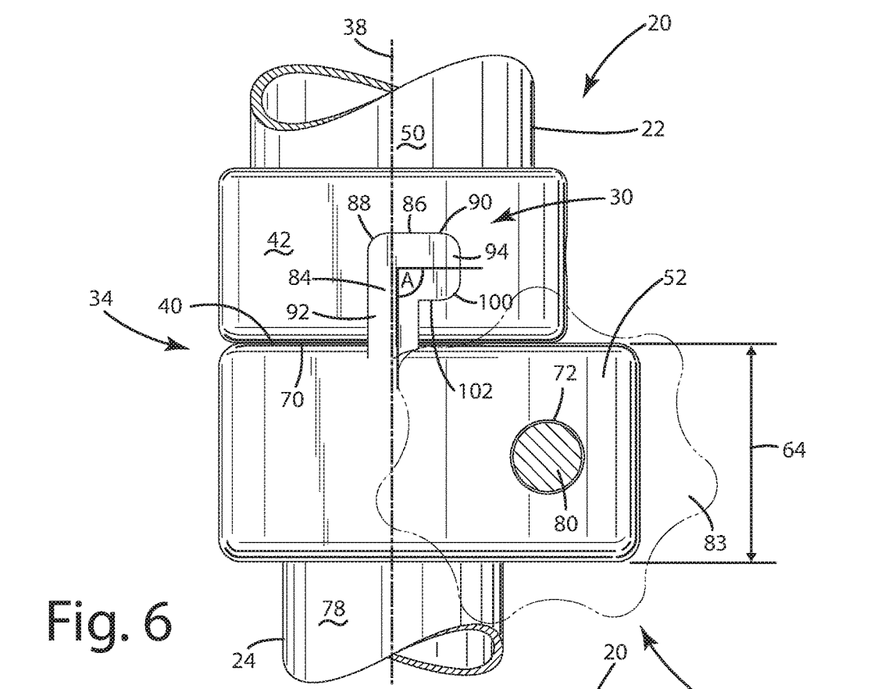
FIG. 6 is a side view of the pole assembly.
Figure 7:
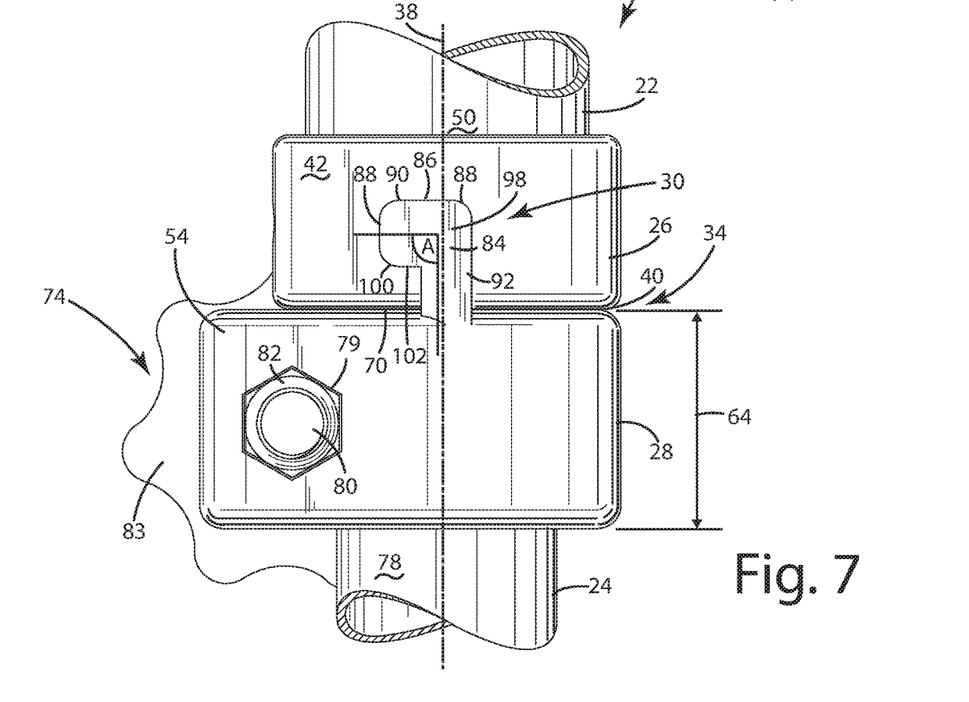
FIG. 7 is a side view of the pole assembly.

As shown in FIGS. 2-7, the lock-and-key coupling 30 can include a key 84 or a plurality of keys and a lock aperture 86 or a plurality of lock apertures. The lock-and-key coupling 30, also referred to herein generally as a coupling, can be distal from the second fastener 74, and can be a completely separate component functionally from the second fastener. The key 84 can extend from at least one of the first collar 26 and the second collar 28. The lock aperture 86 can be defined by and extend through a wall of the other of the at least one of the first collar 28 and the second collar 28. The key 84 can include a key outer surface 88. The key 84 can include a key wall 90. The key wall 90 can trace a perimeter of the key 84. The key 84 can define a shape. In some embodiments the shape of the key 84 is dog-leg shaped (e.g., L-shaped), T-shaped, arrow shaped, or any of various other shapes. Optionally, the key 84 defines a first shape (alternatively referred to more generally as a "dog-leg") including a leg 92 that extends parallel to the longitudinal axis 38 of the first and second tubes 22, 24. A "dog-leg" is a shape that bends sharply; for example, a sharp bend in a road or route may be referred to as being dog-leg shaped and an L-shape may also be referred to alternatively as a dog-leg shape. The first shape can include a foot 94 extending traverse to the longitudinal axis 38 of the first and second tubes 22, 24. As shown in FIGS. 6 and 7, the leg 92 forms an angle A with the foot. In various embodiments the angle A is equal to 90°, is less than or equal to 90° and greater than 0°, or is less than 180° and greater than 0°, or is less than or equal to 135°.

In some embodiments, the key 84 can be joined with the second collar 28. The key 84 can extend upward 96 from the second collar 28 above the second engagement rim 70 and above the first engagement rim 40 of the first collar 26. The key 84 can extend upward 96 above the first arm 52. The key 84 can extend upward 96 from the second engagement rim 70. Optionally, the key 84 is a first key 84 extending from the first arm 52 and a second key 98 extends from the second arm 54. Further optionally, the first key 84 is disposed on the second collar 28 at a position radially opposite the second key 98. Yet further optionally, the first key 84 and the second key 98 share mirror symmetry across the longitudinal axis 38 and in other embodiments the first key 84 and the second key 98 do not share mirror symmetry but, rather, are configured to represent a 180 degree rotation with respect to one another relative to a plane parallel to the longitudinal axis 38. When the lock-and-key coupling 30 includes a plurality of keys 84, 98, each key may have a unique shape or each key may have a shared shape.

The lock aperture 86 can be bounded by a lock aperture wall 100. In various embodiments the lock aperture 86 or plurality of lock apertures is defined by the first collar 26. The key 84 can be disposed within and received by the lock aperture 86 such that the key wall 90 is disposed adjacent to and slidable relative to the lock aperture wall 100. The lock aperture 86 can define a lock aperture shape complimentary to the key 84 shape. In various embodiments, the lock aperture 86 is a dog-leg recess having an open bottom. The lock aperture 86 can include an open bottom, also referred to as an opening or recess, which can transition directly to a lower edge or rim of the collar. A dog-leg key 84 (i.e., a key having a dog-leg shape) interfits in the dog-leg recess 86 (i.e., a recess having a dog-leg shape) with a portion of the dog-leg key 84 extending out through the open bottom and being connected to the second collar 28. In various embodiments, the lock aperture is a recess defined by and not fully extending through the wall 46 of the first collar 26. The key 84 can extend beyond the first engagement rim 40 and second engagement rim 70 and into the lock aperture. The lock aperture wall 100 can form a shelf 102 transverse to the longitudinal axis 38.

The lock-and-key coupling 30 is operable in an adjustment mode in which the first tube 22 can slidably move relative to the second tube 24 while the key 84 is disposed in the lock aperture 100. In the adjustment mode, the second collar 26 can be loosened relative to the second tube 24 by loosening the second fastener 74 so that the first tube 22 can slidably move relative to the second tube 24 while the key 84 is disposed in the lock aperture 86 with the key 84 at a first distance from the longitudinal axis 38. The lock-and-key coupling 30 can be operable in a lock mode in which the first tube 22 is in a fixed orientation relative to the second tube 24 while the key 84 is disposed in the lock aperture 100. In the lock mode, the second collar 28 clampingly engages the second tube 24 so that the first tube 22 is in a fixed orientation relative to the second tube 24 while the key 84 is disposed in the lock aperture with the key 84 at a second distance, less than the first distance, from the longitudinal axis 38. The foot 94 can be configured to engage the shelf 102 to prevent the first collar 26 and the second collar 28 from separating from one another in both the adjustment mode and the lock mode.

The first engagement rim 40 can remain static (i.e., remains stationary and does not undergo any motion relative to the first tube 22 and does not undergo any geometrical alterations, such as expansion or contraction of a diameter) in both the adjustment mode and the lock mode. At least a portion of the second engagement rim 70 can move toward the second tube 24 when the lock-and-key coupling 30 transitions to the lock mode from the adjustment mode. At least a portion of the second engagement rim 70 can move away from the second tube 24 when the lock-and-key coupling 30 transitions to the adjustment mode from the lock mode. In the lock mode, the first tube 22 is fixed in position along the second tube 24 and cannot freely slide along the second tube 24. In the adjustment mode, the first tube 22 can freely slide along the second tube 24 and is not fixed in position along the second tube 24.

The key wall 90 can be disposed adjacent and slidable relative to the lock aperture wall 100 (alternatively referred to as a wall bounding the lock aperture) when the lock-and-key coupling 30 transitions from the adjustment mode to the lock mode. The key 84 can move and/or slide within the lock aperture 86 as the second fastener 74 is tightened when the lock-and-key coupling 30 transitions from the adjustment mode to the lock mode. The key 84 can move and/or slide within the lock aperture 86 as the second fastener 74 is loosened when the lock-and-key coupling 30 transitions from the lock mode to the adjustment mode. The key outer surface 88 can move inward relative to the first collar 26 outer surface 42 as the second fastener 74 is tightened. The key in the aperture can prevent the second collar from separating from the first collar before, during and after the telescoping or other movement of the tubes relative to one another. In some cases, the key 84 moves with the first arm 52 and within the lock aperture 86 simultaneously as the second fastener 74 is tightened or loosened.

Figure 1:
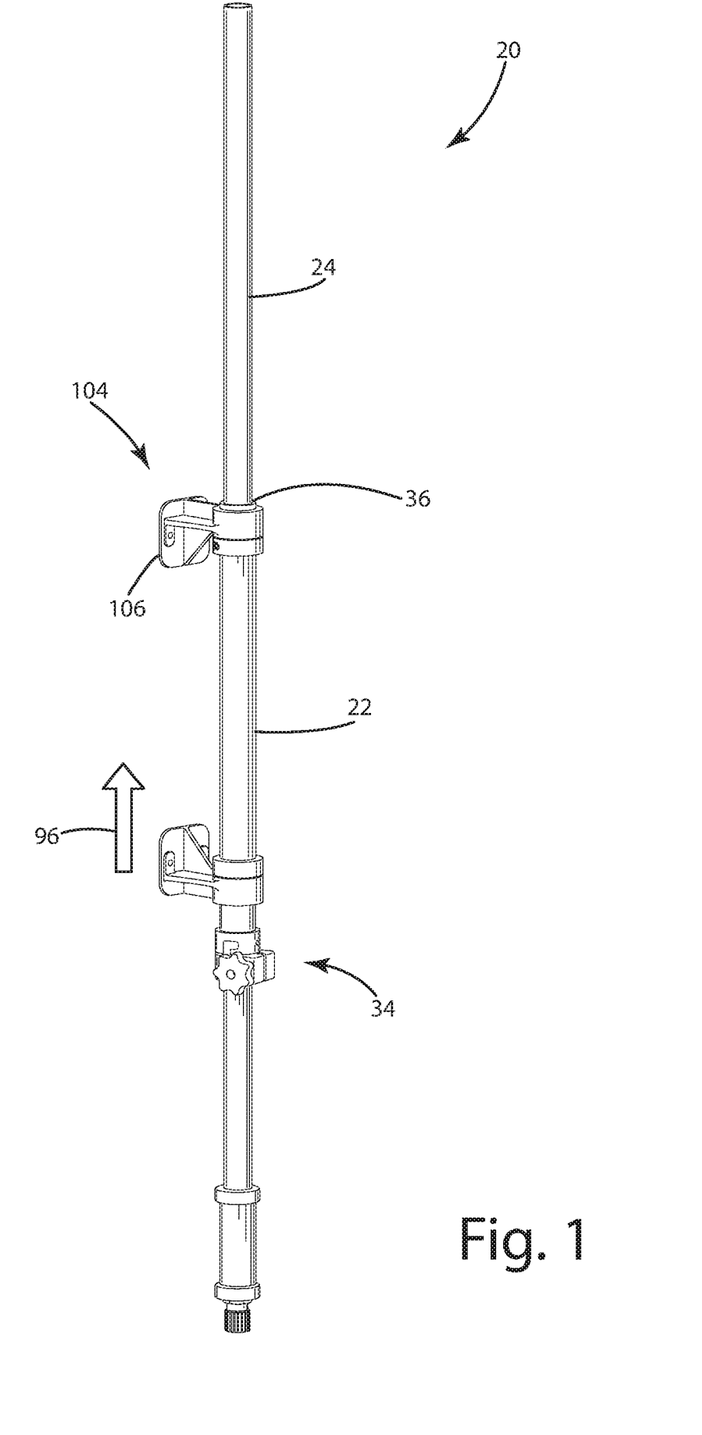
FIG. 1 is a perspective view of a pole assembly.
Figure 2:
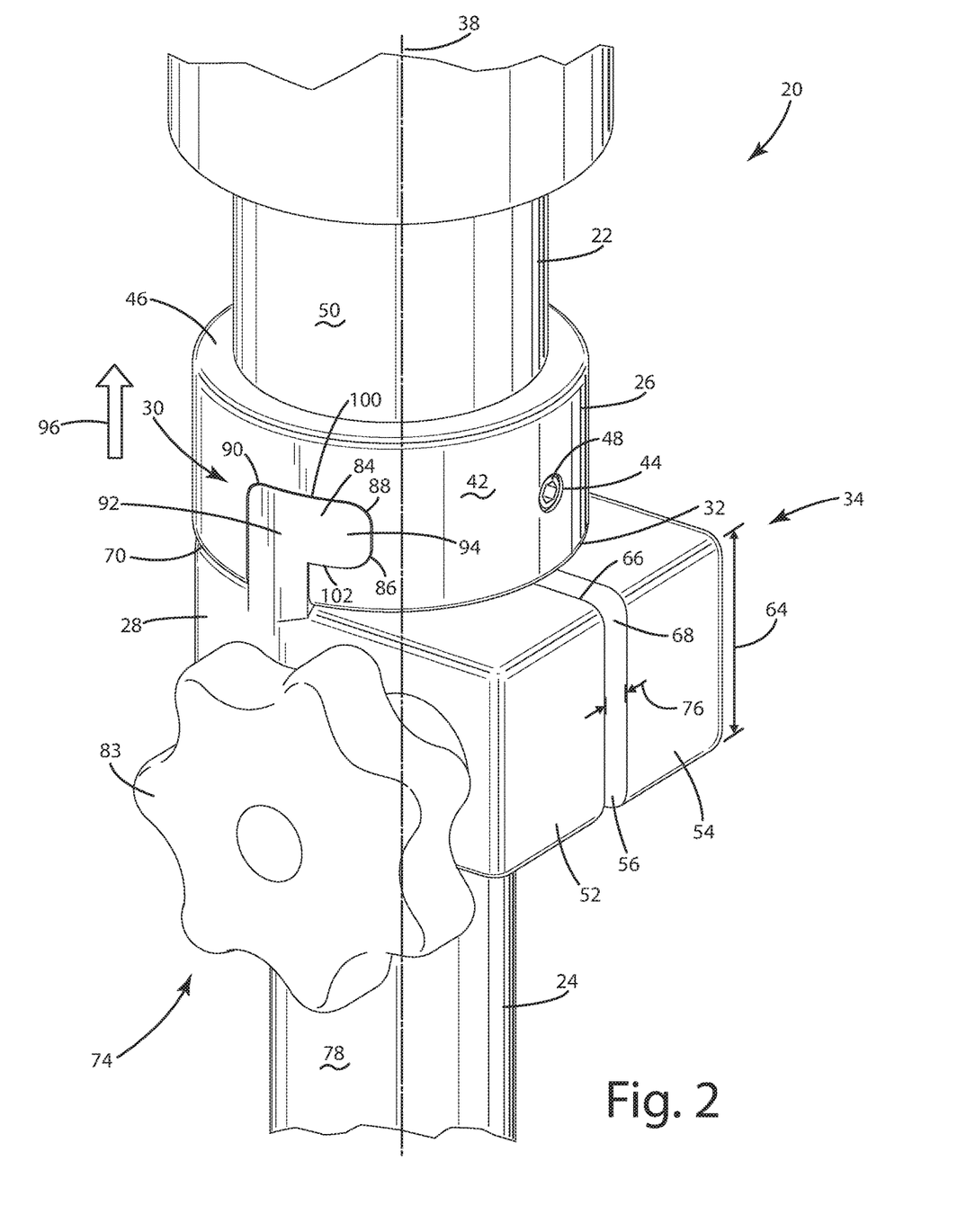
FIG. 2 is a perspective view of the pole assembly.
Figure 3:
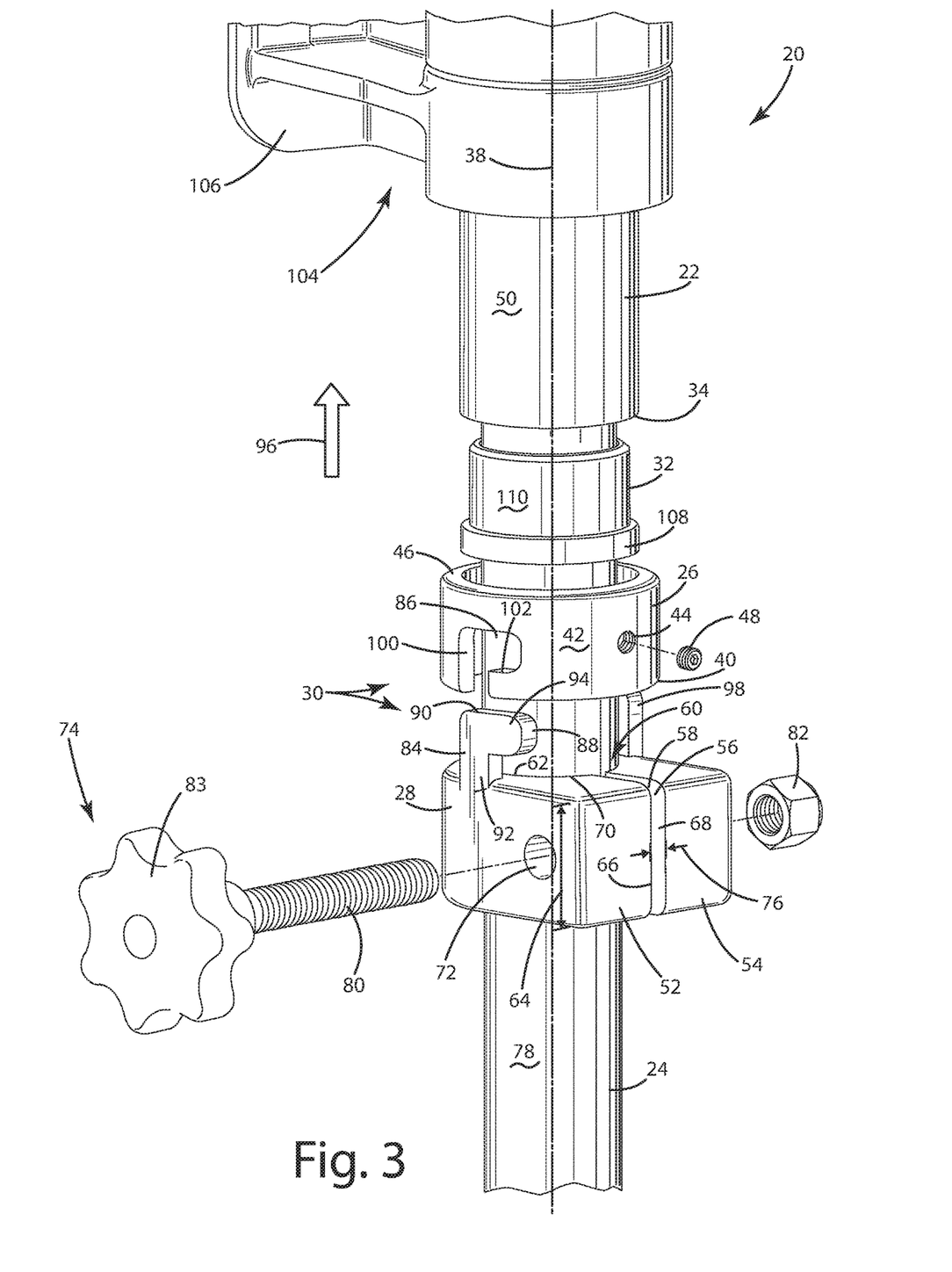
FIG. 3 is an exploded view of the pole assembly.
Figure 4:
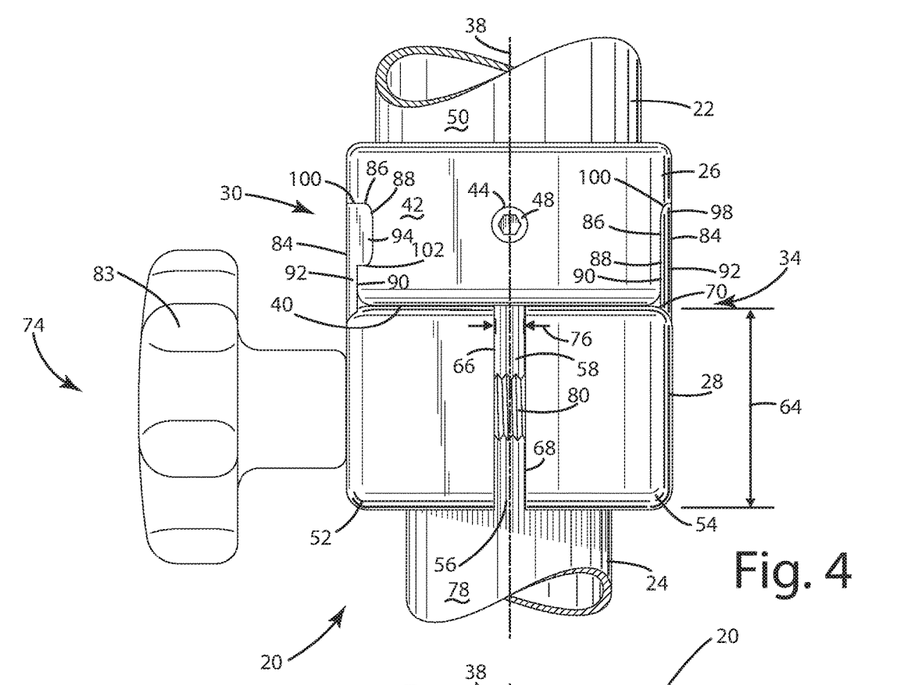
FIG. 4 is a front view of the pole assembly.
Figure 5:
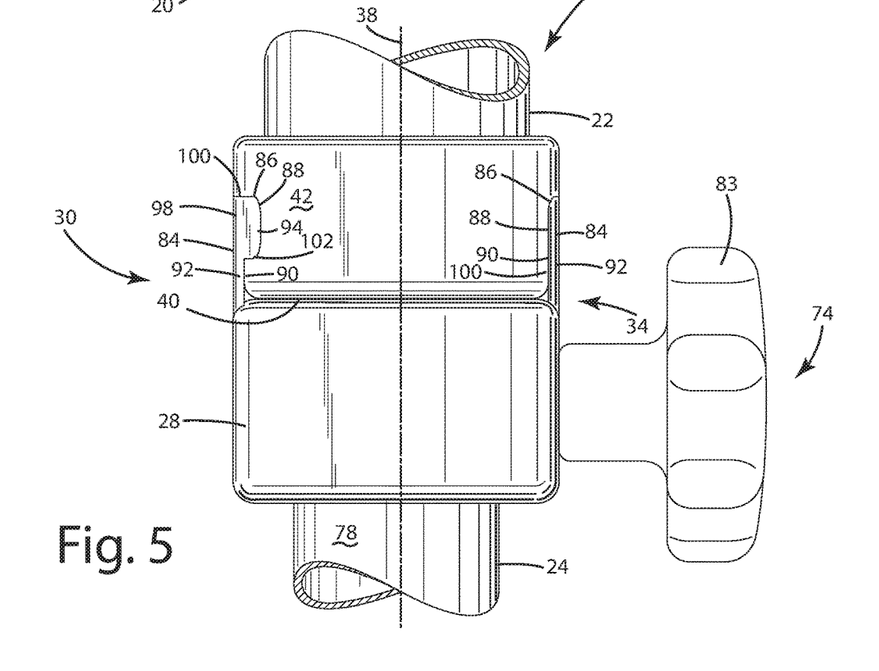
FIG. 5 is a back view of the pole assembly.
Figure 9:
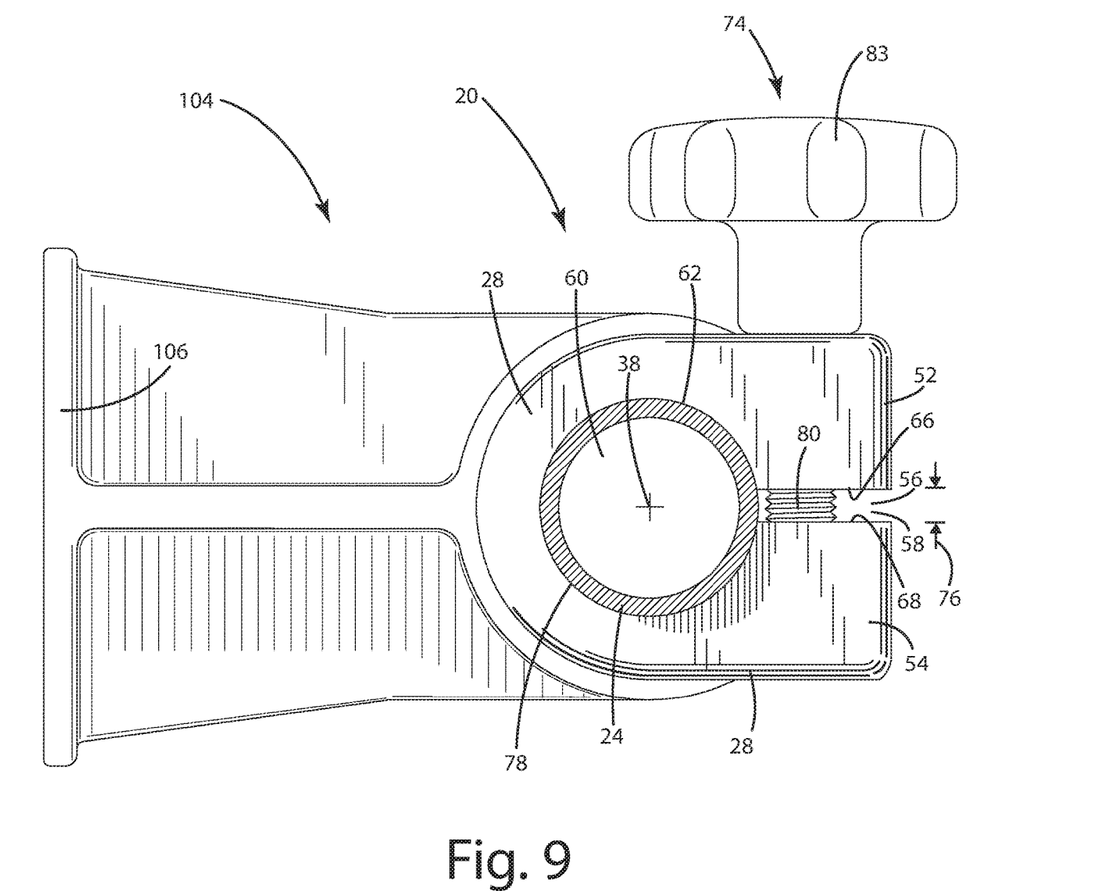
FIG. 9 is a bottom view of the pole assembly.

Optionally, as shown in FIGS. 1, 3, and 9, the pole assembly 20 can include a mount 104 disposed on the first tube 22 at a preselected point distal from the first collar 26. In some cases, the pole assembly 20 includes a plurality of mounts 104 each disposed at a different location on the first tube 22 at a preselected point distal from the first collar 26. The mount 104 can include a flange 106 configured to support an object. The object may be, as non-limiting examples, a light, a speaker, or any of various other devices. Optionally, the pole assembly 20 includes two mounts 104 disposed on the first tube 22 that cooperatively support the object. In use, the pole assembly 20 can be arranged vertically and can be configured to support the object at an elevation above the ground.

Figure 8:
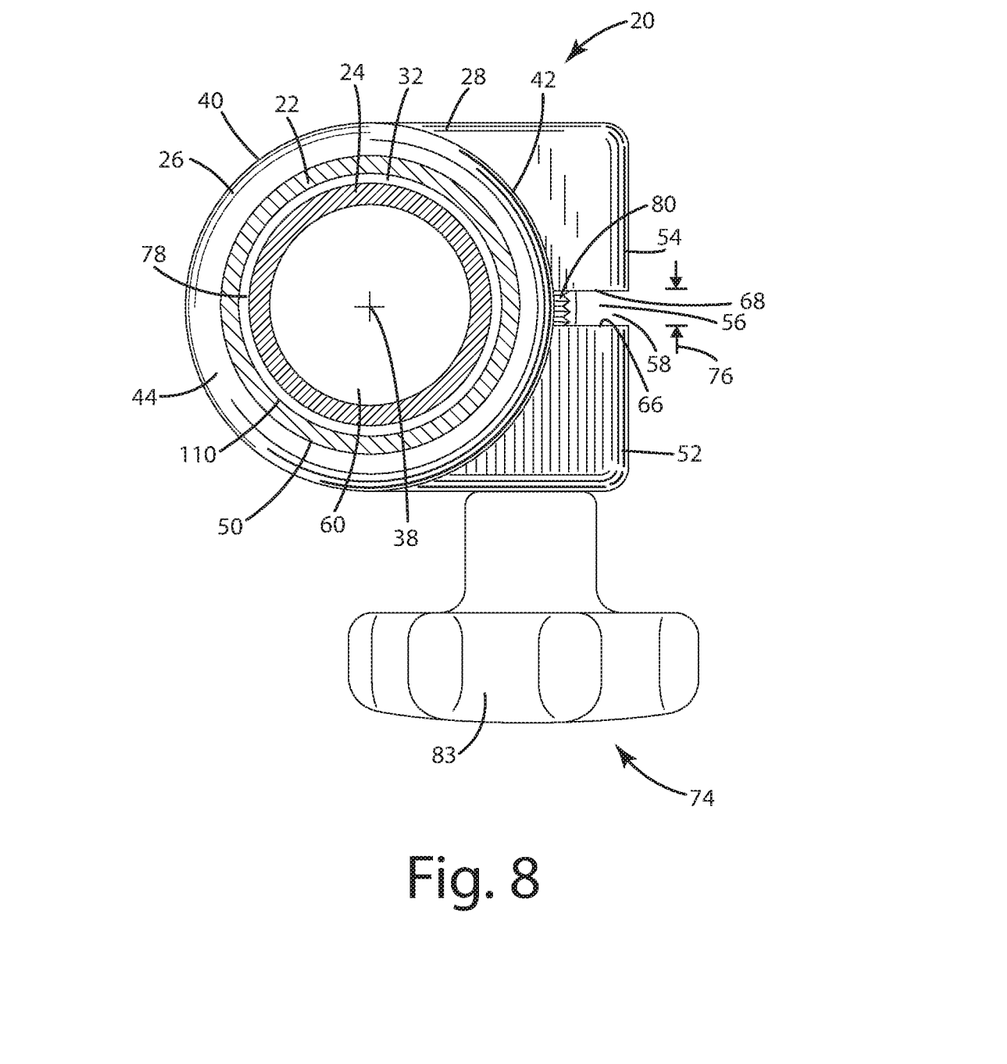
FIG. 8 is a top view of the pole assembly.

As shown in FIGS. 3 and 8, the pole assembly 20 can include a bushing 32. The bushing 32 can include an annular flange 108 extending radially from a terminal end of an outer surface 110 of the bushing 32. An outer edge of the annular flange 108 defines a flange diameter. The flange diameter can be approximately equal to a diameter defined by the outer surface 50 of the first tube 22, and a diameter defined by the outer surface 110 of the bushing 32 is approximately equal to the inner diameter of the first tube 22. The first collar 26 can be disposed at least partially around the bushing 32. The second tube 24 can be slidably disposed in the bushing 32. The bushing 32 can be disposed in the first end 34 of the first tube 22 so that the annular flange 108 abuts the first end 34. The first collar 26 can be secured to the first end 34 so as to secure the bushing 32 to the first end 34. Optionally, the first collar 26 can include an internally disposed lip (not shown) in abutment with the annular flange 108 to prevent withdrawal of the bushing 32 from the first tube 22. The bushing 32 can be axially aligned with the longitudinal axis 38.

A method of operating the pole assembly 20 can include providing the pole assembly 20 described above. The method can include sliding the first tube 22 over the second tube 24 in the adjustment mode to move the first tube 22 along the second tube 24 from a first position on the second tube 24. The method can include tightening the second fastener 74 to clampingly engage the second tube 24 in a lock mode so as to fix an orientation of the second tube 24 relative to the first tube 22 and thereby fix the first tube 22 at a second position on the second tube 24. The method can include moving the key 84 in the lock aperture 86 during tightening of the second fastener 74 so the key 84 moves radially inward toward the longitudinal axis 38 without the key 84 clamping the first tube 22 and/or second tube 24. In various embodiments, moving the key 84 includes sliding a wall 90 of the key 84 relative to the lock aperture 86 wall 100. The key 84 in the lock aperture 86 can prevent the second collar 28 from separating from the first collar 26 during the sliding.

As shown in FIGS. 2 and 3-7, the foot 94 can overlap the shelf 102 so as to prevent or obstruct the first collar 26 from moving relative to the second collar 28 in parallel to the longitudinal axis 38, but can permit the key 84 to slide in the lock aperture 86, for example, toward and away from the tubes. Optionally, the method can include removing the key 84 from the lock aperture 86 to separate the second collar 28 from the first collar 26 when the second fastener 74 is loosened.

A method of assembling the pole assembly 20 can include inserting the key 84 within the lock aperture 86 prior to securing the second collar 28 to the first tube 22 and prior to inserting the second tube 24 through the first tube 22. The key 84 can be inserted into the lock aperture 86 to couple the second collar 28 with the first collar 26 while the second fastener 74 is loosened or, in some embodiments, while the second fastener 74 is not inserted within the fastener aperture 72.

In various embodiments, a length of the pole assembly 20 may be adjusted telescopically such that in the adjustment mode the first tube 22 or the second tube 24 may be slid telescopically with respect to the other tube such that the telescopic sliding of one tube with respect to the other causes a length of the pole assembly 20 to become longer or shorter. For example, in some cases, the second tube 24 can be telescopically adjusted with respect to the first tube 22. In the lock mode the length of the pole is fixed. In some cases, in the adjustment mode sliding of the first tube 22 along the second tube 24 or of the second tube 24 along the first tube 22 effectuates a change in length of the pole assembly 20. In various embodiments, the mount 104 is secured to the second tube 24 and, in the adjustment mode, the second tube 24 can be extended upward in a telescopic manner with respect to the first tube 22 so that extending the second tube 24 upward causes a raising of the mount 104.

The various elements of the components of the pole assembly 20 described above, e.g. the first tube 22, the second tube 24, the first collar 26, the second collar 28, the key 84, the bushing 32, the mount 104, the first fastener 48, and the second fastener 74, may be manufactured from, and thus ultimately comprise, the same or different material(s), such as any one or more of the materials described below. Moreover, each element may itself comprise a combination of different materials, and thus may not comprise a homogeneous composition throughout. In certain embodiments, one or more of the components of the pole assembly 20 (e.g. the first tube 22, the second tube 24, the first collar 26, the second collar 28, the key 84, the bushing 32, the mount 104, the first fastener 48, and the second fastener 74, etc.) is monolithic in construction.

In general, materials suitable for use in or as the first tube 22, the second tube 24, the first collar 26, the second collar 28, the key 84, the bushing 32, the mount 104, the first fastener 48, and the second fastener 74 include metals (e.g. steels, aluminums, alloys, etc.), resins (e.g. thermoset and/or thermoplastic resins), rubbers/elastomers, and combinations thereof. However, myriad materials may be used to manufacture the elements of the pole assembly 20, each typically selected as a function of availability, cost, performance/end use applications, etc. Moreover, metals, metal alloys, rubbers/elastomers, and resins are not exhaustive of suitable materials that may be used.

In certain embodiments, the pole assembly 20 comprises a resin, such as a thermoplastic and/or thermoset resin. In such embodiments, the first tube 22, the second tube 24, the first collar 26, the second collar 28, the key 84, the bushing 32, the mount 104, the first fastener 48, and the second fastener 74 may each independently comprise an independently selected resin. Examples of suitable resins typically comprise the reaction product of a monomer and a curing agent, although resins formed of self-polymerizing monomers (i.e., those acting as both a monomer and a curing agent) may also be utilized.

With regard to composition of the particular components described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

In various embodiments, any of the components of the pole assembly 20 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof.

The terms "upward," "up," "downward," or "down" are employed herein simply as indicators of relative direction, orientation, or position within various embodiments and are not intended to be limiting. One of skill in the art will readily understand, for example, that various components of the pole assembly may be oriented in various orientations with respect to one another. For example, the first collar 26 and the second collar 28 may be positioned at either end of the first tube 22, which might necessitate a change in relative "upward" or "downward" configuration of the first collar 26 and second collar 28 with respect to one another as a function of position on the first tube 22 (i.e., positioned at the first end 34 or the second end 36).

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

What is claimed is:

1. A pole assembly configured to support a device at an elevation, the pole assembly comprising:
   a first tube and a second tube, the second tube slidably disposed in the first tube;
   a first collar fixedly and immovably mounted to a first end of the first tube, the second tube configured to protrude from the first end;
   a second collar configured for placement adjacent the first collar, the second collar at least partially circumferentiating the second tube;
   a lock-and-key coupling including a key extending from at least one of the first collar and the second collar and a lock aperture defined by and extending through a wall of the other of the at least one of the first collar and the second collar, wherein the key is received in the lock aperture, and is configured to move at least one of radially inward toward and radially outward away from a longitudinal axis of the first and second tubes;

wherein the lock-and-key coupling is operable in an adjustment mode in which the second collar is loosened relative to the second tube so that the first tube can slidably move relative to the second tube while the key is disposed in the lock aperture with the key at a first distance from the longitudinal axis, wherein the lock-and-key coupling is operable in a lock mode, in which the second collar clampingly engages the second tube so that the first tube is in a fixed orientation relative to the second tube, while the key is disposed in the lock aperture with the key at a second distance, less than the first distance, from the longitudinal axis.

2. The assembly of claim 1,
wherein the lock aperture is bounded by a lock aperture wall,
wherein the key includes a key wall,
wherein the key wall is disposed adjacent and slidable relative to the lock aperture wall when the lock-and-key coupling transitions from the adjustment mode to the lock mode.

3. The assembly of claim 2,
wherein the key includes a leg that extends parallel to the longitudinal axis and a foot that extends transverse to the longitudinal axis,
wherein the lock aperture wall forms a shelf transverse to the longitudinal axis.

4. The assembly of claim 3,
wherein the foot is configured to engage the shelf to prevent the first collar and the second collar from separating from one another in both the adjustment mode and the lock mode.

5. The assembly of claim 1 comprising:
a fastener extending through a first arm and a second arm of the second collar,
wherein the fastener is configured to be tightened to draw the first and second arms toward one another and thereby clampingly engage the second tube.

6. The assembly of claim 5,
wherein the fastener is distal from the lock-and-key coupling,
wherein the key slides within the lock aperture as the fastener is tightened when the lock-and-key coupling transitions from the adjustment mode to the lock mode.

7. The assembly of claim 1,
wherein the first collar includes a first engagement rim,
wherein the second collar includes a second engagement rim,
wherein the first engagement rim is disposed adjacent the second engagement rim,
wherein the first engagement rim remains static in both the adjustment mode and the lock mode,
wherein at least a portion of the second engagement rim moves toward the second tube when the lock-and-key coupling transitions to the lock mode.

8. The assembly of claim 7,
wherein the key extends beyond the first engagement rim and second engagement rim and into the lock aperture.

9. The assembly of claim 8,
wherein the lock aperture is defined by the first collar,
wherein the key is joined with the second collar,
wherein the key extends upward from the second collar, above the second engagement rim and above the first engagement rim of the first collar.

10. The assembly of claim 1 comprising:
a mount disposed on the first tube at a preselected location distal from the first collar,
wherein the mount includes a flange configured to support a light.

11. The assembly of claim 1 comprising:
a bushing disposed in the first tube at the first end,
wherein the first collar is disposed at least partially around the bushing,
wherein the second tube is slidably disposed in the bushing,
wherein the first collar is secured to the first end so as to secure the bushing to the first end.

12. A pole assembly configured to support a device at an elevation, the pole assembly comprising:
a first tube and a second tube where the second tube is slidably disposed in the first tube;
a first collar fixedly and immovably mounted to a first end of the first tube, the second tube configured to protrude from the first end;
a second collar configured for placement adjacent the first collar, the second collar at least partially circumferentiating the second tube;
wherein a lock-and-key coupling is operable in an adjustment mode in which the first tube can slidably move relative to the second tube while a key extending from one of the first and second collars is disposed in a lock aperture defined by the other of the first and second collars,
wherein the lock-and-key coupling is operable in a lock mode in which the first tube is in a fixed orientation relative to the second tube while the key is disposed in the lock aperture,
wherein the key is received within the lock aperture, and is configured to slide radially inward toward a longitudinal axis of the first and second tubes when the lock-and-key coupling transitions from the adjustment mode to the lock mode.

13. The assembly of claim 12,
wherein the first collar includes a first engagement rim,
wherein the second collar includes a second engagement rim,
wherein the first engagement rim is disposed adjacent the second engagement rim,
wherein the first engagement rim remains static in both the adjustment mode and the lock mode,
wherein at least a portion of the second engagement rim moves toward the second tube when the lock-and-key coupling transitions to the lock mode,
wherein the key extends beyond the first engagement rim and second engagement rim and into the lock aperture.

14. The assembly of claim 12,
wherein the key is a dog-leg key,
wherein the lock aperture is a dog-leg recess having an open bottom,
wherein the dog-leg key interfits in the dog-leg recess, with a portion of the dog-leg key extending out through the open bottom and being connected to the second collar.

15. The assembly of claim 12,
wherein the second collar includes a first arm and a second arm joined with a fastener,
wherein the key extends upward from the second collar, above the first arm,
wherein the fastener is configured to be tightened to draw the first arm and second arm toward one another, to thereby clampingly engage the second tube in the lock mode,
wherein the key is configured to slide radially inward toward the longitudinal axis of the first and second tubes when the fastener is tightened.

16. The assembly of claim 15,
wherein the key moves with the first arm and within the lock aperture simultaneously as the fastener is tightened,
wherein the key includes a key outer surface,
wherein the first collar includes a first collar outer surface,
wherein the key outer surface moves inward relative to the first collar outer surface as the fastener is tightened.

17. The assembly of claim 12,
wherein the key includes a leg that extends parallel to the longitudinal axis and a foot that extends transverse to the longitudinal axis,
wherein the lock aperture includes a shelf transverse to the longitudinal axis,
wherein the foot is configured to engage the shelf to prevent the first collar and the second collar from separating from one another in both the adjustment mode and the lock mode.

18. A method of operating a pole assembly, the method comprising:
providing a pole assembly having a first tube and a second tube inside the first tube, with a first collar and second collar adjacent one another and at least partially circumferentiating the first tube and the second tube respectively;
sliding the first tube over the second tube in an adjustment mode to move the first tube along the second tube from a first position on the second tube;
tightening a fastener to clampingly engage the second tube in a lock mode so as to fix an orientation of the first tube relative to the second tube and thereby fix the first tube at a second position on the second tube; and
moving a key extending from one of the first and second collars in a lock aperture defined by the other of the first and second collars during the tightening so the key moves radially inward toward a longitudinal axis of the first and second tubes, without the key clamping the first and second tubes,
wherein the key remains in the aperture in the lock mode and the adjustment mode,
wherein the key in the lock aperture prevents the second collar from separating from the first collar during the sliding.

19. The method of claim 18 comprising:
sliding a wall of the key relative to a wall bounding the lock aperture during the moving of the key,
wherein the key includes a foot,
wherein the lock aperture includes a shelf,
wherein the foot overlaps the shelf so as to prevent the first collar from moving relative to the second collar in parallel to the longitudinal axis, but permits the key to slide in the lock aperture.

20. The method of claim 19 comprising:
removing the key from the lock aperture to separate the second collar from the first collar when the fastener is loosened.

* * * * *